(12) United States Patent
Kita

(10) Patent No.: US 6,364,300 B1
(45) Date of Patent: Apr. 2, 2002

(54) CLAMP APPARATUS

(75) Inventor: Kazushi Kita, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/575,795

(22) Filed: May 22, 2000

(30) Foreign Application Priority Data

May 24, 1999 (JP) ............................................. 11-144019

(51) Int. Cl.[7] ................................................. B23Q 3/08
(52) U.S. Cl. ............................... 269/32; 269/49; 269/47
(58) Field of Search ............................. 269/32, 34, 49, 269/52, 47, 93; 279/2.06, 2.09

(56) References Cited

U.S. PATENT DOCUMENTS

| 4,294,444 A | * | 10/1981 | Horton ......................... 269/32 |
| 5,845,897 A | * | 12/1998 | Tunkers ........................ 269/32 |

FOREIGN PATENT DOCUMENTS

| EP | 0 894 572 | 2/1999 |
| FR | 2 733 930 | 11/1996 |
| FR | 2 755 049 | 4/1998 |
| FR | 2 757 437 | 6/1998 |
| JP | 9-192968 | 7/1997 |

OTHER PUBLICATIONS

Patent Abstracts of Japan, vol. 018, No. 498 (M–1675), Sep. 19, 1994, JP 06 170604, Jun. 21, 1994.

* cited by examiner

Primary Examiner—Robert C. Watson
(74) Attorney, Agent, or Firm—Oblon, Spivak, McClelland, Maier & Neustadt, P.C.

(57) ABSTRACT

A clamp apparatus comprises a single driving unit for displacing a piston rod in the axial direction, clamp arms which are rotatable by predetermined angles in accordance with the displacement action of the piston rod, a positioning pin which is displaceable in the axial direction in accordance with the displacement action of the piston rod, and a driving force-transmitting mechanism for operating the clamp arms and the positioning pin substantially simultaneously by transmitting the driving force of the driving unit to the clamp arms and the positioning pin respectively.

14 Claims, 8 Drawing Sheets

F I G. 5
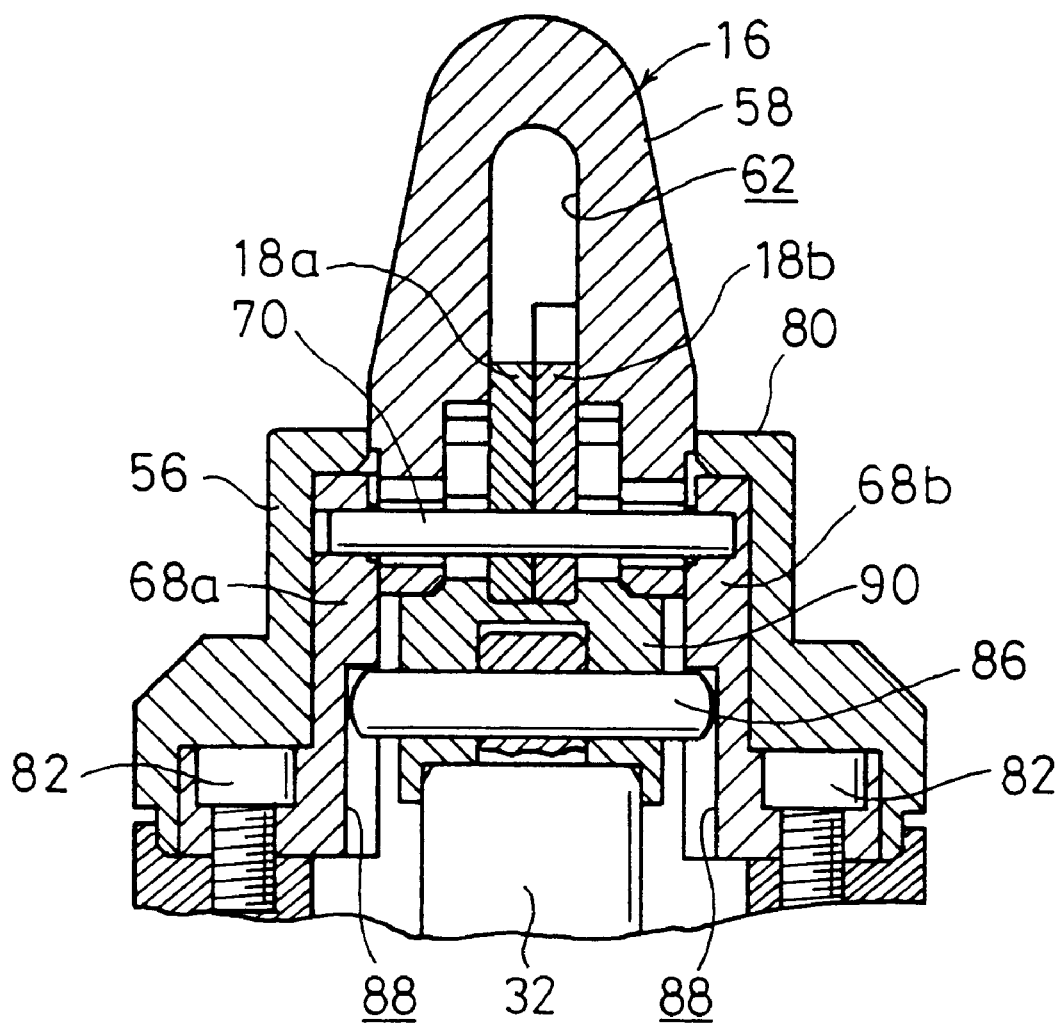

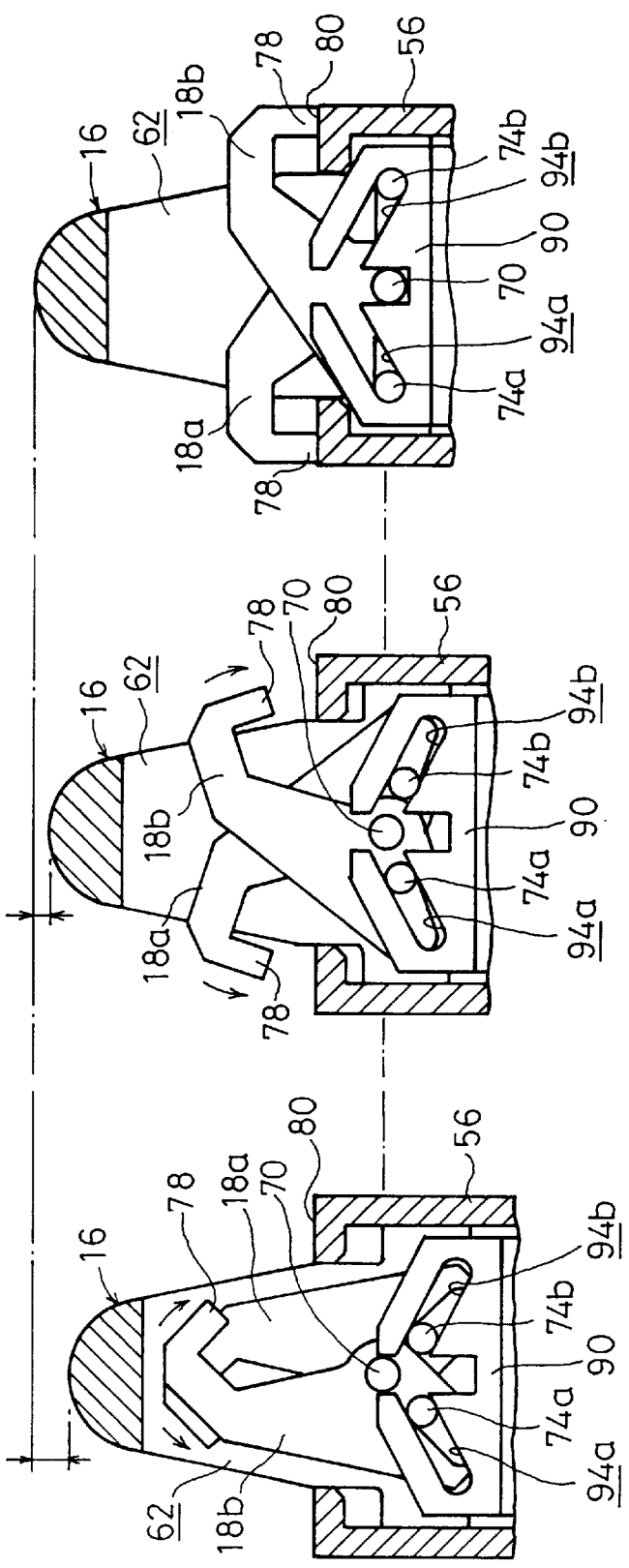

CLAMP APPARATUS

BACKGROUND OF THE INVENTION

1. Field of the Invention

The present invention relates to a clamp apparatus for clamping a workpiece with a clamp arm, which operates in accordance with the driving action of a driving unit.

2. Description of the Related Art

Conventionally, for example, in welding components of automobiles or the like, a clamp apparatus has been used for clamping the components (for example, see Japanese Laid-Open Patent Publication No. 9-192968).

In Japanese Laid-Open Patent Publication No. 9-192968, as shown in FIG. 10, a clamp apparatus comprises an outer cylinder 2 and clamp arms 3a and 3b. The outer cylinder 2 has a contact surface 1 at a top end for a workpiece (not shown) to be in contact with the contact surface 1. The clamp arms 3a and 3b clamp the workpiece on the contact surface 1. At one end of the outer cylinder 2, a positioning pin 4 is arranged being inserted into an unillustrated positioning hole defined in the workpiece.

At the other end of the outer cylinder 2, a driving cylinder 5 for a positioning pin and a driving cylinder 6 for clamp arms are respectively provided. The driving cylinder 5 for a positioning pin changes an external diameter of the positioning pin 4 with respect to the positioning hole by displacing the positioning pin 4 in an axial direction. The driving cylinder 6 for clamp arms displaces the clamp arms 3a and 3b in the axial direction.

The conventional clamp apparatus disclosed in Japanese Laid-Open Patent Publication No. 9-192968 requires two driving units, that is, the driving cylinder 5 for displacing the positioning pin 4 and the driving cylinder 6 for operating the clamp arms 3a and 3b. Therefore, in the above clamp apparatus, there are disadvantages that the size of the entire apparatus becomes large and production costs thereof become high. Further, when the above clamp apparatus is provided in an arm of a robot, there is a disadvantage that the arm of the robot suffers from a heavy load, since the size of the entire apparatus becomes large and the weight thereof becomes high.

SUMMARY OF THE INVENTION

A general object of the present invention is to provide a clamp apparatus for operating a positioning pin and a clamp arm respectively by one driving unit, thereby allowing the entire apparatus to have a compact shape and to have a light weight.

A main object of the present invention is to provide a clamp apparatus for operating a positioning pin and a clamp arm respectively by one driving unit, thereby reducing the production cost thereof.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a longitudinal sectional view taken along the line V—V shown in FIG. 1;

FIG. 6 is an explanatory view for illustrating an operation showing an Initial position of an unclamp state of the clamp apparatus;

FIG. 7 is an explanatory view for illustrating an operation showing the clamp arm rotated by a predetermined angle from the state shown in FIG. 6;

FIG. 8 is an explanatory view for illustrating an operation showing the clamp arm further rotated by a predetermined angle from the state shown in FIG. 7;

DESCRIPTION OF THE PREFERRED EMBODIMENTS

The clamp apparatus according to the present invention will be exemplified by a preferred embodiment, and it will be described in detail below with reference to accompanying drawings.

Figure 1:
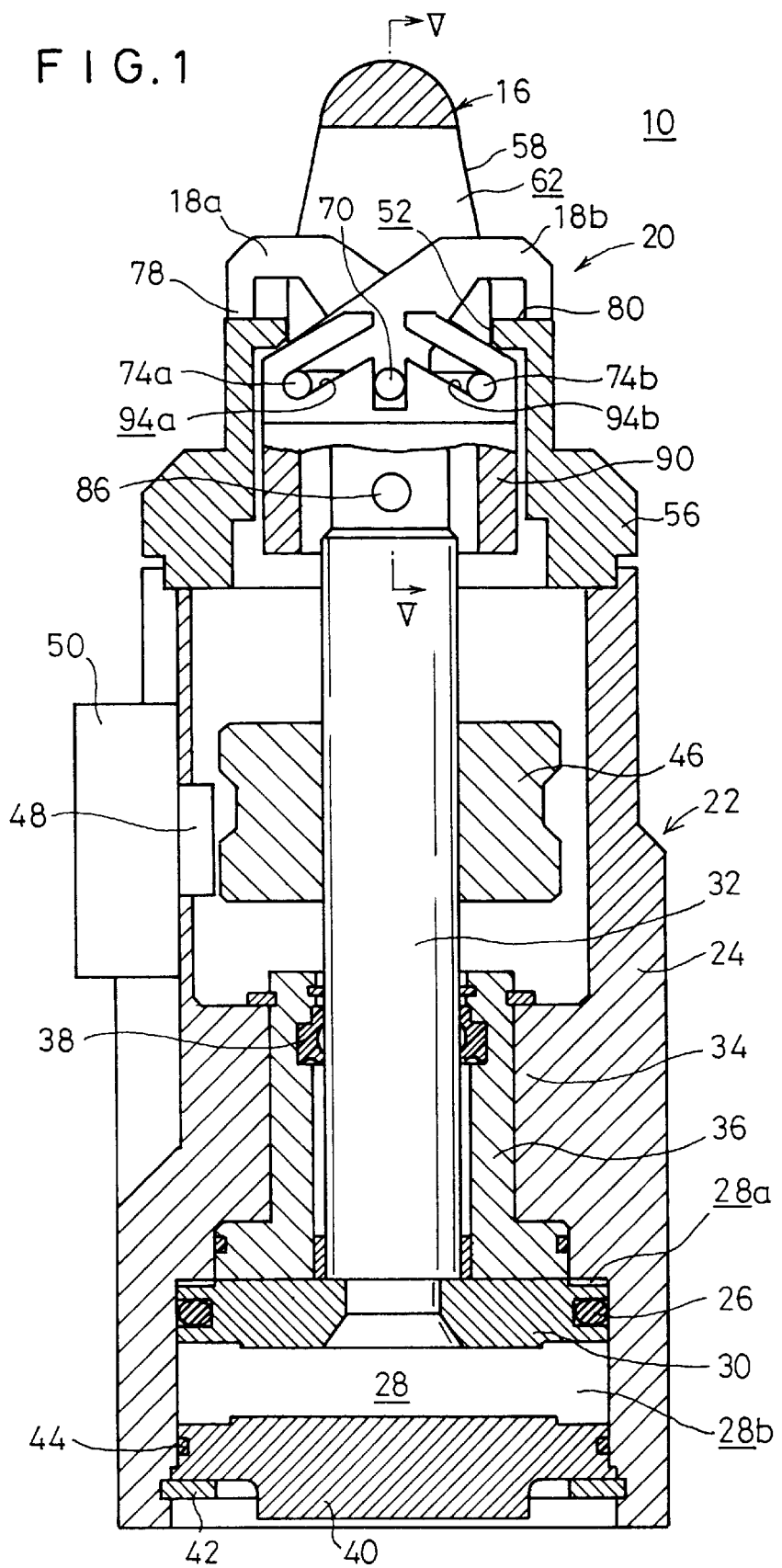
FIG. 1 is a longitudinal sectional view along an axial direction of a clamp apparatus according to an embodiment of the present invention.
Figure 2:
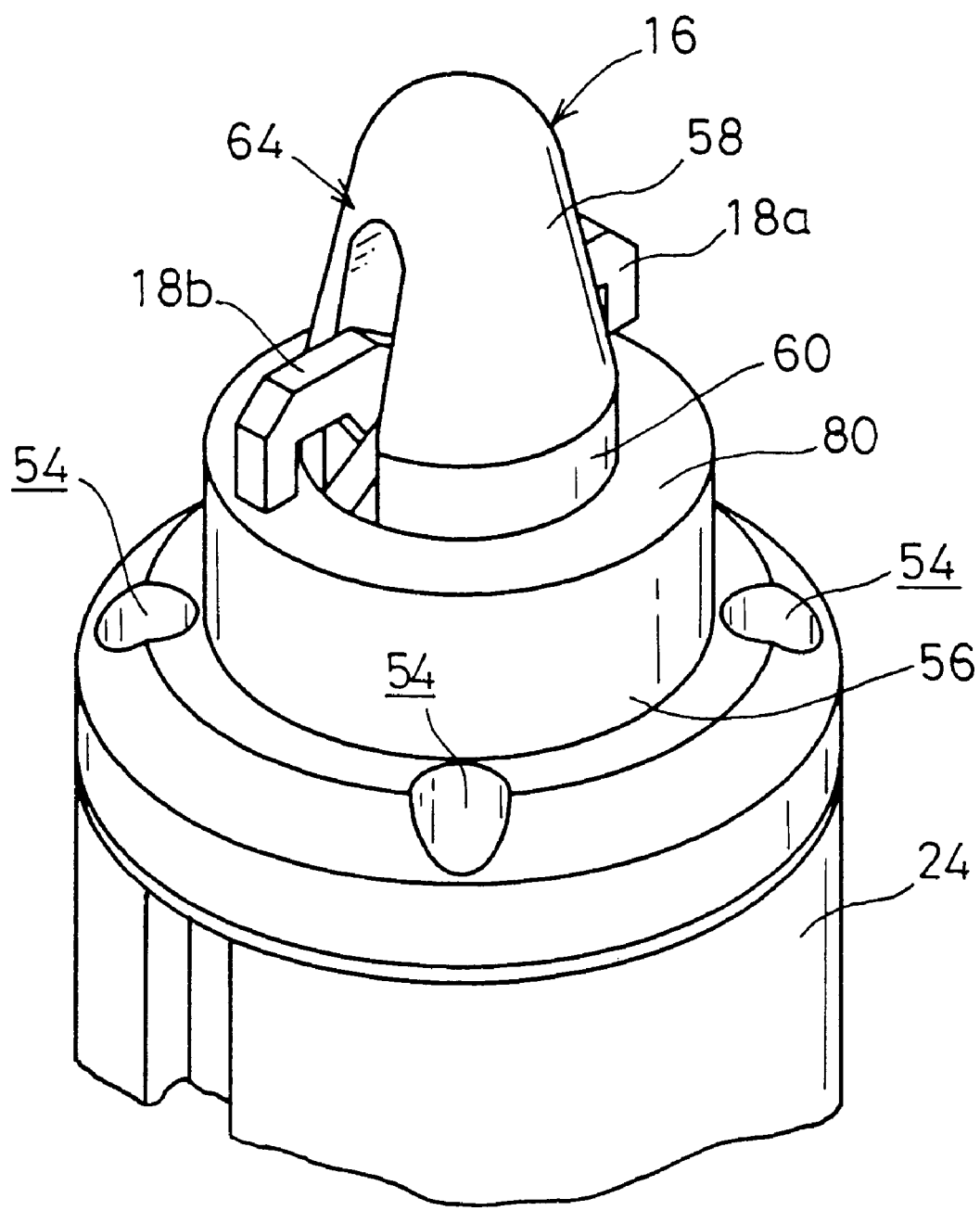
FIG. 2 is a perspective view of a workpiece clamp unit of the clamp apparatus.

In FIG. 1, a clamp apparatus 10 according to an embodiment of the present invention is shown. The clamp apparatus 10 comprises a workpiece clamp unit 20 including a positioning pin 16 for being inserted into a positioning hole 14 formed in a workpiece 12 (see FIG. 9) to determine the position when the workpiece 12 is clamped, and clamp arms 18a, 18b for clamping the workpiece 12; and a driving unit (driving mechanism) 22 for interlocking the positioning pin 16 and the clamp arms 18a, 18b substantially simultaneously.

The driving unit 22 includes a cylinder tube (body) 24 having a cylindrical configuration, a piston 30 with a piston packing 26 installed to an annular groove on its outer circumferential surface, for making displacement along a cylinder chamber 28 formed in the cylinder tube 24, a piston rod (rod member) 32 with its one end fastened to the piston 30, and a cylindrical bearing member 36 held by an expanded section 34 of the cylinder tube 24. A plurality of pressure fluid inlet/outlet ports (not shown), which are connected to an unillustrated pressure fluid supply source for supplying a pressure fluid to an upper cylinder chamber 28a and a lower cylinder chamber 28b comparted by the piston 30 respectively, are formed for the cylinder tube 24.

A rod packing 38, which slidably contacts with the outer circumferential surface of the piston rod 32 to function as a seal, is installed to the inner circumferential surface of the bearing member 36. A cover member 40 for closing the cylinder chamber 28 is installed to a first end of the cylinder tube 24 by the aid of a retaining ring 42. An O-ring 44 for maintaining the air-tight state of the cylinder chamber 28 is installed to an annular groove on the outer circumferential surface of the cover member 40.

A dog 46 is fixed to the outer circumferential surface of the piston rod 32. A sensor 48 is arranged for detecting the position of the piston 30 by detecting the dog 46 which is displaceable integrally with the piston 30. The sensor 48 is fixed to the cylinder tube 24 by the aid of a holding member 50.

Figure 3:
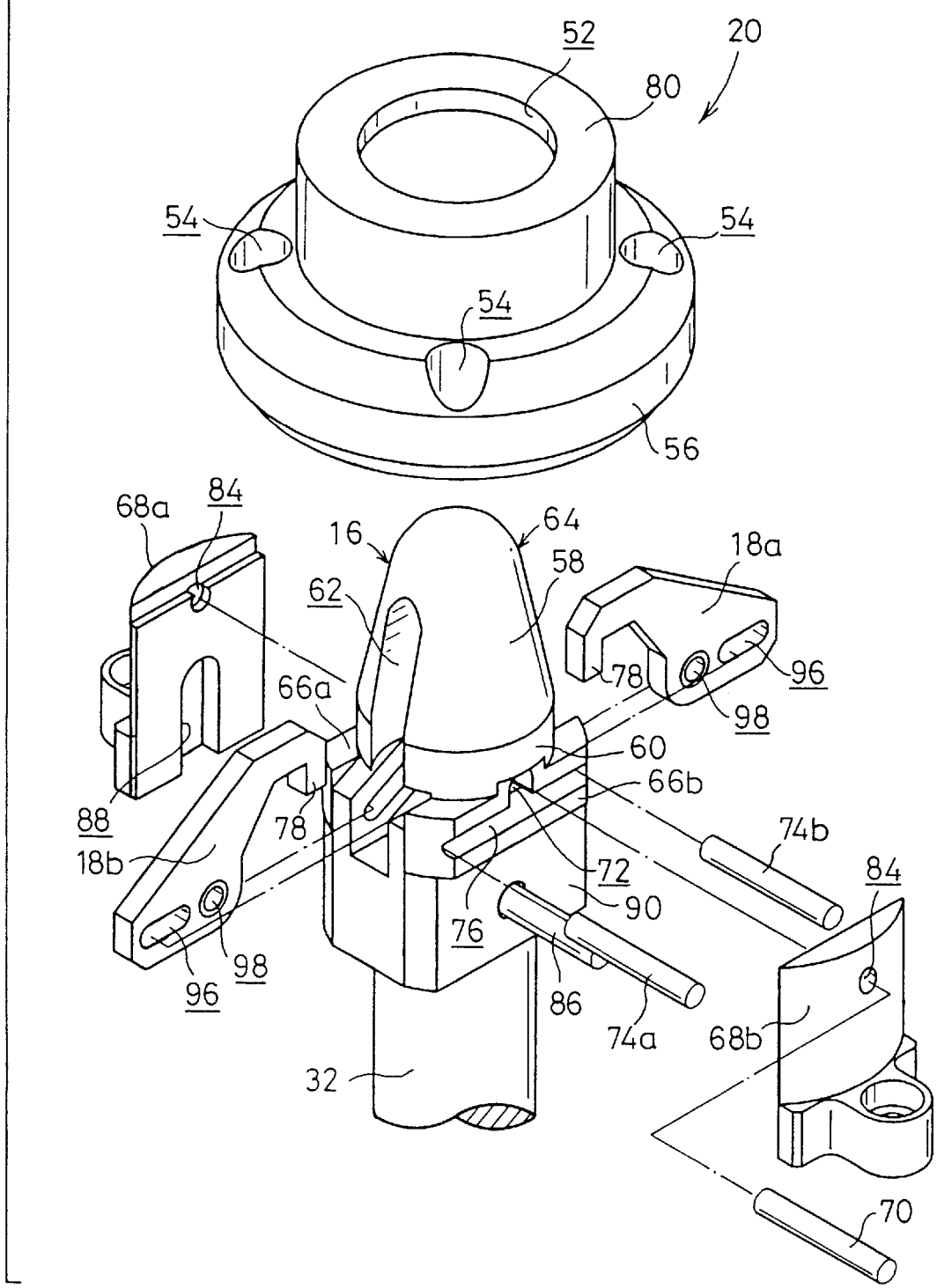
FIG. 3 is an exploded perspective view of the workpiece clamp unit.
Figure 4:
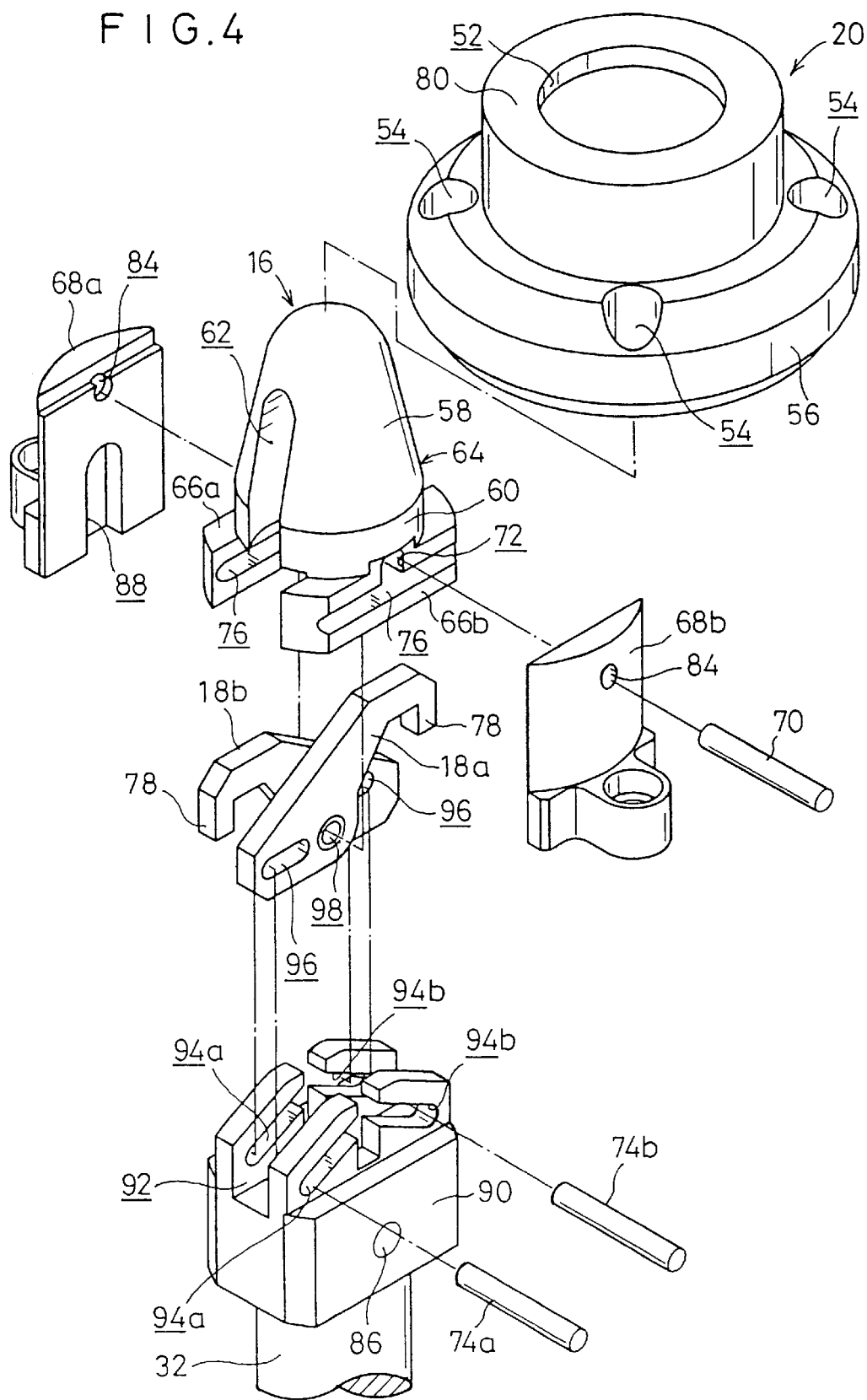
FIG. 4 is an exploded perspective view of the workpiece clamp unit.

As shown in FIGS. 3 and 4, the workpiece clamp unit 20 includes a stepped ring member 56 which has a circular opening 52 formed at a central portion, for being coupled to the end of the cylinder tube 24 by the aid of unillustrated screw members to be inserted into holes 54; and the positioning pin 16 which is provided displaceably in the axial direction through the circular opening 52.

The positioning pin 16 comprises a pin section 64 which is provided with a tapered surface 58 having its diameter gradually reduced to a first end, a circumferential surface 60 which continues to the tapered surface 58, and an accommodating hole 62 for accommodating the pair of clamp arms 18a, 18b; and a pair of block members 66a, 66b which are integrally coupled to the lower end of the pin section 64 and which are opposed to one another while being separated from each other by a predetermined distance. Each of the block members 66a, 66b has a long hole 72 for inserting a fixed pin 70 which extends in the axial direction and which is pivotably supported by a pair of bearing members 68a, 68b as described later on, and an engaging hole 76 which extends in a direction substantially perpendicular to the axis, for making engagement with a pair of first movable pin 74a and a second movable pin 74b respectively as described later on.

The stepped ring member 56 is formed with an annular contact surface 80 for making contact with the workpiece 12 to clamp the workpiece 12 in cooperation with pawls 78 of the clamp arms 18a, 18b. The pair of bearing members 68a, 68b are interposed between the stepped ring member 56 and the cylinder tube 24 by the aid of bolts 82 fastened to the cylinder tube 24 (see FIG. 5). Holes 84 for pivotably supporting the fixed pin 70 are formed through upper portions of the pair of bearing members 68a, 68b respectively. The pair of clamp arms 18a, 18b is provided so that they are rotatable by predetermined angles about a center of rotation of the fixed pin 70 to be attached as a shaft. The pair of bearing members 68a, 68b are formed with grooves 88 which are formed to have a substantially semielliptic configuration for making engagement with a coupling pin 86 as described later on. The grooves 88 are engaged with the coupling pin 86 so that they function to prevent the coupling pin 86 from disengagement, and they function to prevent a holding fixture 90 from rotation as to described later on.

The holding fixture 90 is coupled to the other end of the piston rod 32 by the aid of the coupling pin 86. The holding fixture 90 is provided so that it is displaceable in the axial direction integrally with the piston rod 32. A recess 92 is formed at a substantially central portion of the holding fixture 90, for operating the pair of clamp arms which are rotatably supported by the fixed pin 70. A pair of engaging long grooves 94a, 94b, which are inclined by predetermined angles while slanting downwardly to the right and the left respectively, are formed on both sides of the recess 92. The first movable pin 74a and the second movable pin 74b are engaged with the engaging long grooves 94a, 94b. The first movable pin 74a and the second movable pin 74b are provided so that they are rollable along the engaging long grooves 94a, 94b.

The block members 66a, 66b of the positioning pin 16 are installed to the holding fixture 90 by the aid of step sections. In this arrangement, the first movable pin 74a and the second movable pin 74b are provided so that they are supported by the engaging holes 76 formed in the block members 66a, 66b, the engaging long grooves 94a, 94b formed in the holding fixture 90, and the long grooves 96 formed in the clamp arms 18a, 18b.

The pair of clamp arms 18a, 18b has an identical shape respectively. Each of the clamp arms 18a, 18b has the pawl 78 for clamping the workpiece 12, the long groove 96 provided on the side opposite to the pawl 78, for engaging with the first movable pin 74a and the second movable pin 74b, and the hole 98 for allowing the fixed pin 70 to penetrate therethrough to be supported thereby as the shaft.

The holding fixture 90, the first movable pin 74a, the second movable pin 74b, and the block members 66a, 66b function as the driving force-transmitting mechanism.

The clamp apparatus 10 according to the embodiment of the present invention is basically constructed as described above. Next, its operation, function, and effect will be explained.

At first, the clamp apparatus 10 is attached to an arm of a robot (not shown) by the aid of an unillustrated attachment means. First ends of unillustrated tube members such as tubes are connected to the pair of pressure fluid inlet/outlet ports (not shown) respectively, and second ends of the tube members are connected to the unillustrated pressure fluid supply source.

FIG. 6 shows an unclamped state, and FIG. 8 shows a clamped state. The following description will be made assuming that the unclamped state shown in FIG. 6 is the initial position.

In this arrangement, at the initial position shown in FIG. 6, the pair of clamp arms 18a, 18b are accommodated in the accommodating hole 62, giving a state in which they do not protrude from the tapered surface 58 of the pin section 64. The first movable pin 74a and the second movable pin 74b are positioned on the upper sides of the engaging long grooves 94a, 94b respectively in the vicinity of the fixed pin 70 disposed at the substantially central portion.

Figure 9:
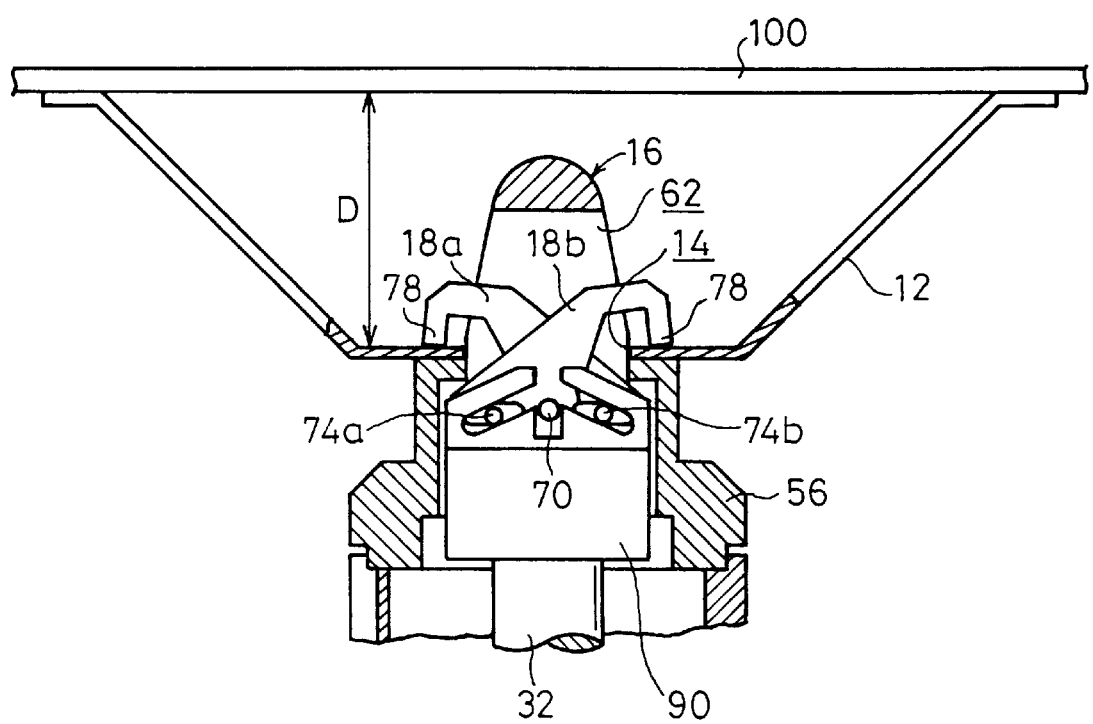
FIG. 9 is a partial longitudinal sectional view showing a clamp state of a workpiece.
Figure 10:
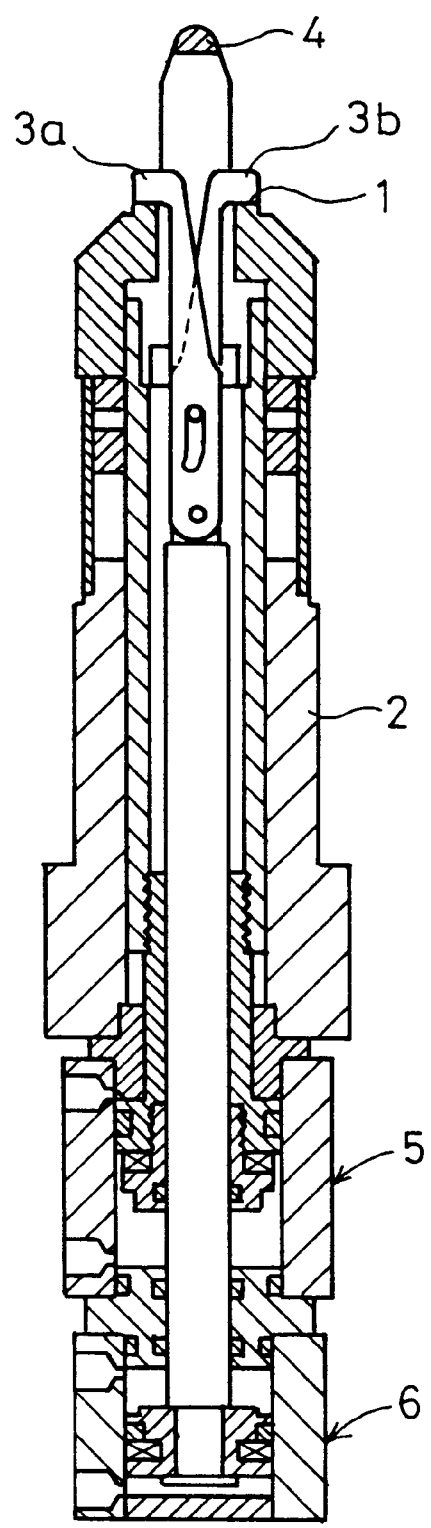
FIG. 10 is a longitudinal sectional view of a conventional clamp apparatus.

As shown in FIG. 9, the workpiece 12, which is the member to be fixed, is composed of a grip-shaped fastening member having the positioning hole 14. The workpiece 12 is positioned and fixed to the lower surface of a planar panel member 100 by using the clamp apparatus 10 according to the embodiment of the present invention, and the joined surface of the panel member 100 and the workpiece 12 is welded by the aid of an unillustrated welding means.

After performing the preparatory operation as described above, the unillustrated arm of the robot is operated so that the positioning pin 16 of the clamp arm 10 is allowed to approach the positioning hole 14 of the fastening member as the workpiece 12, and the clamp apparatus 10 is moved to the position at which the positioning hole 14 corresponds to the positioning pin 16.

At an initial position at which the positioning hole 14 of the workpiece 12 corresponds to the positioning pin 16, the unillustrated pressure fluid supply source is operated to introduce the pressure fluid (for example, compressed air) from the first pressure fluid inlet/outlet port into the cylinder chamber 28b disposed on the lower side of the piston 30. The piston 30 is pressed in accordance with the action of the pressure fluid introduced into the lower cylinder chamber 28b, and the piston 30 is moved upwardly along the cylinder chamber 28.

In this arrangement, the piston rod 32 and the holding fixture 90, which are coupled to one another by the aid of the coupling pin 86, are moved upwardly integrally with the piston 30. The positioning pin 16 is moved upwardly by a predetermined distance along the long holes 72 formed in the block members 66a, 66b of the positioning pin 16. Accordingly, the positioning pin 16 is inserted, in a positioned state, into the positioning hole 14 of the workpiece 12 along with the tapered surface 58.

The piston rod 32 and the holding fixture 90, which are coupled to one another by the aid of the coupling pin 86, are moved upwardly integrally with the piston 30. Accordingly, the first movable pin 74a and the second movable pin 74b are moved downwardly along the engaging long grooves 94a, 94b which are inclined by the predetermined angles, and they are displaced along the engaging holes 76 which extend substantially in the horizontal direction. In other words, the first movable pin 74a and the second movable pin 74b are moved downwardly while rolling respectively along the engaging long grooves 94a, 94b slanting downwardly to the left and the right, and they are displaced from the center in the direction to make separation from each other along the engaging holes 76 which are disposed substantially horizontally (see FIG. 7). The fixed pin 70 is in a fixed state, because it is supported by the bearing members 68a, 68b.

In this arrangement, the first movable pin 74a and the second movable pin 74b are engaged with the long grooves 96 of the pair of clamp arms 18a, 18b. Accordingly, the pair of clamp arms 18a, 18b are rotated and displaced about the center of rotation of the fixed pin 70 such that the pawls 78 are rotated and displaced in the directions to make approach to the contact surface 80 respectively.

As described above, the positioning pin 16 is moved upwardly to be inserted into the positioning hole 14 of the workpiece 12, simultaneously with which the clamp arms 18a, 18b are rotated and displaced in the directions to make approach to the contact surface 80 while being interlocked with the positioning pin 16, in accordance with the driving action of the single driving unit 22.

The displacement amount, which is brought about when the positioning pin 16 is moved upwardly, is set to be smaller than the displacement amount of the piston 30. That is, the displacement amount of the positioning pin 16 is determined depending on the angle of inclination of the engaging long grooves 94a, 94b formed in the holding fixture 90. The larger the angle of inclination with respect to the horizontal axis is, the larger the displacement amount of the positioning pin 16 is.

As shown in FIG. 8, the first movable pin 74a and the second movable pin 74b arrive at the downward terminal ends of the engaging long grooves 94a 94b which are inclined by the predetermined angles, and they arrive at the ends of the engaging holes 76 which are disposed substantially horizontally. Accordingly, the workpiece 12 is clamped between the pawls 78 of the clamp arms 18a, 18b and the contact surface 80 of the stepped ring member 56. Thus, the workpiece 12 is fixed by the aid of the clamp arms 18a, 18b in the state of being positioned at the predetermined position by the positioning pin 16 inserted into the positioning hole 14 (see FIG. 9).

The stop position at the upward end of the piston 30 is detected by the sensor 48 by the aid of the dog 46.

In the state in which the workpiece 12 is clamped, the desired operation is performed, for example, by means of the unillustrated welding means. After that, the pressure fluid is supplied to the upper cylinder chamber 28a to move the piston 30 downwardly in accordance with the switching action of an unillustrated changeover valve. Accordingly, the positioning pin 16 is moved downwardly in the direction to make separation from the positioning hole 14 of the workpiece 12. The clamp arms 18a, 18b are rotated and displaced in the directions opposite to the above while being interlocked with the positioning pin 16. Thus, the clamped state is released.

That is, the piston rod 32 and the holding fixture 90, which are coupled to one another by the aid of the coupling pin 86, are moved downwardly integrally with the piston 30. Accordingly, the positioning pin 16 is moved downwardly along with the long holes 72. Substantially simultaneously, the first movable pin 74a and the second movable pin 74b are moved upwardly while rolling respectively along the engaging long grooves 94a, 94b which are inclined by the predetermined angles, and they are displaced in the directions to make approach to one another from the ends toward the center along the engaging holes 76 which are disposed substantially horizontally. Therefore, the positioning pin 16 is displaced so that it is separated from the positioning hole 14, simultaneously with which the pair of clamp arms 18a, 18b are rotated and displaced in the directions to make separation from the workpiece 12 respectively. The clamp arms 18a, 18b are accommodated in the accommodating hole 62 formed in the positioning pin 16. Thus, restoration is made to the initial position shown in FIG. 6.

In the embodiment of the present invention, the positioning pin 16 which is displaced in the axial direction, and the clamp arms 18a, 18b which are operated and rotated by the predetermined angles about the center of rotation of the fixed pin 70 can be operated substantially simultaneously in accordance with the driving action of the single driving unit 22.

Therefore, the positioning pin 16 is interlocked with the clamp arms 18a, 18b by using the single driving unit 22. Accordingly, it is unnecessary to provide distinct driving sources for the positioning pin and for the clamp arms respectively. Thus, it is possible to obtain a compact shape of the entire apparatus, and the production cost can be reduced. Further, the load on the arm of the robot can be mitigated by allowing the entire apparatus to have a light weight, and it is possible to improve the operability of the arm of the robot.

In the embodiment of the present invention, the displacement amount of the positioning pin 16, which is brought about during the upward movement or the downward movement thereof, is set to be different from the displacement amount of the piston 30. That is, in the embodiment of the present invention, the displacement amount of the positioning pin 16 is determined by the angles of inclination of the engaging long grooves 94a, 94b formed on the holding fixture 90. The displacement amount of the positioning pin 16 is set to be about a half of the displacement amount of the piston 30. The apparatus can be preferably used even in the case of a small spacing distance D (see FIG. 9) between the panel member 100 and the positioning hole 14 of the workpiece 12, by setting the displacement amount of the positioning pin 16 to be small as compared with the displacement amount of the piston 30 as described above.

In the embodiment of the present invention, the apparatus is designed such that the clamped state is given in which the workpiece 12 is clamped when the piston 30 arrives at the top dead center when the cylinder is used as the driving source. The workpiece 12 is clamped when the pressure-receiving area of the piston 30 is maximum, i.e., when the driving force of the cylinder is maximum. Therefore, the clamping force on the workpiece 12 can be exhibited up to the maximum.

In the embodiment of the present invention, the cylinder is used as the driving unit 22. However, there is no limitation thereto. It is also preferable to use, for example, an unillustrated electric actuator or an unillustrated electric motor. In the embodiment of the present invention, explanation has been made by using the pair of clamp arms 18a, 18b. However, there is no limitation thereto. It is also possible to use a single clamp arm or a plurality of clamp arms.

According to the present invention, the following effect is obtained.

That is, the single driving mechanism can be used to operate the positioning pin and the clamp arms substantially simultaneously. Therefore, it is unnecessary to provide respective driving mechanism corresponding to the clamp arms and the positioning pin. Accordingly, the shape of the entire apparatus can be made compact, and it is possible to obtain a light weight. As a result, the number of parts can be decreased, and the production cost can be reduced.

What is claimed is:

1. A clamp apparatus for clamping a workpiece by clamp arms, the workpiece positioned by inserting a positioning pin into a positioning hole formed in the workpiece, comprising:

a body;

a single driving mechanism configured to displace a rod member provided in said body along an axial direction of said body;

said clamp arms rotatable by predetermined angles in accordance with the displacing action of said rod member;

said positioning pin capable of being displaced along the axial direction of said body in accordance with the displacing action of said rod member; and a driving force-transmitting mechanism configured to operate said clamp arms and said positioning pin respectively, substantially simultaneously by transmitting driving force of said driving mechanism to said clamp arms and said positioning pin, respectively;

wherein said driving force-transmitting mechanism comprises a holding fixture coupled to said rod member, engaging long grooves formed on said holding fixture and inclined by predetermined angles, engaging holes, formed in said positioning pin and extending substantially horizontally, a long groove provided on each of the clamp arms and movable pins engaged with said engaging long grooves, said engaging holes and said long groove, respectively.

2. The clamp apparatus according to claim 1, wherein said holding fixture is coupled to said rod member by a couple pin, said coupling pin is provided so as to being engaged with a groove formed on bearing members which pivotably supports said clamp arms via a fixed pin.

3. The clamp apparatus according to claim 1, wherein said driving mechanism comprises at least a cylinder.

4. The clamp apparatus according to claim 1, wherein displacement amount of said positioning pin is determined by an angle of inclination with respect to a horizontal axis of said engaging long grooves.

5. The clamp apparatus according to claim 4, wherein the displacement amount of said positioning pin is set to be about a half of displacement amount of a piston.

6. The clamp apparatus according to claim 1, wherein said body is provided with a sensor configured to detect a position of said rod member by detecting a dog fixed to said rod member.

7. The clamp apparatus according to claim 1, wherein said body is provided with detecting means for detecting a position of said rod member by detecting a dog fixed to said rod member.

8. A clamp apparatus for clamping a workpiece having a positioning hole formed therein, comprising:

a body;

single driving means for displacing a rod member provided in said body along an axial direction of said body;

a plurality of clamp arms rotatable by predetermined angles in accordance with the displacing action of said rod member;

a positioning pin configured to be inserted into the positioning hole of the workpiece, said positioning pin being capable of being displaced along the axial direction of said body in accordance with the displacing action of said rod member; and driving force-transmitting means for transmitting driving force of said driving mechanism to said clamp arms and said positioning pin, respectively, for operating said clamp arms and said positioning pin respectively, substantially simultaneously;

wherein said driving force-transmitting means comprises a holding fixture coupled to said rod member, engaging long grooves formed on said holding fixture and inclined by predetermined angles, engaging holes, formed in said positioning pin and extending substantially horizontally, a long groove provided on each of the clamp arms and movable pins engaged with said engaging long grooves, said engaging holes and said long groove, respectively.

9. The clamp apparatus according to claim 8, wherein said holding fixture is coupled to said rod member by a couple pin, said coupling pin is provided so as to being engaged with a groove formed on bearing members which pivotably supports said clamp arms via a fixed pin.

10. The clamp apparatus according to claim 8, wherein said driving means comprises at least one cylinder.

11. The clamp apparatus according to claim 8, wherein a displacement amount of said positioning pin is determined by an angle of inclination with respect to a horizontal axis of said engaging long grooves.

12. The clamp apparatus according to claim 11, wherein the displacement amount of said positioning pin is set to be about a half of a displacement amount of a piston.

13. The clamp apparatus according to claim 8, wherein said body is provided with a sensor configured to detect a position of said rod member by detecting a dog fixed to said rod member.

14. The clamp apparatus according to claim 8, wherein said body is provided with sensing means for detecting a position of said rod member by detecting a dog fixed to said rod member.

* * * * *